United States Patent [19]
Ho

[11] Patent Number: 5,667,756
[45] Date of Patent: Sep. 16, 1997

[54] STRUCTURE OF OZONIZER

[75] Inventor: Hsi-Yin Ho, Taipei, Taiwan

[73] Assignee: Lin-Chang International Co., Ltd., Taipei Hsien, Taiwan

[21] Appl. No.: 769,481

[22] Filed: Dec. 18, 1996

[51] Int. Cl.[6] ............................................. B01J 19/12
[52] U.S. Cl. ............................ 422/186.18; 422/186.07
[58] Field of Search ..................... 422/186.07, 186.18; 204/176

[56] References Cited

U.S. PATENT DOCUMENTS

| | | | |
|---|---|---|---|
| 4,774,062 | 9/1988 | Heinemann | 422/186.19 |
| 5,008,087 | 4/1991 | Batchelor | 422/186.22 |
| 5,147,614 | 9/1992 | Conrad | 422/186.18 |
| 5,332,556 | 7/1994 | Coakley et al. | 422/186.18 |
| 5,348,709 | 9/1994 | Wheatley | 42/186.18 |
| 5,354,541 | 10/1994 | Sali et al. | 422/186.07 |
| 5,437,843 | 8/1995 | Kuan | 422/186.07 |
| 5,458,856 | 10/1995 | Marie et al. | 422/186 |
| 5,503,809 | 4/1996 | Coate et al. | 422/186.1 |

*Primary Examiner*—Charles T. Jordan
*Assistant Examiner*—Daniel Jenkins
*Attorney, Agent, or Firm*—Varndell Legal Group

[57] ABSTRACT

An ozonizer including a hollow connecting member having a metal contact pin connected on one terminal of a high voltage generator, two wind guide shells fastened to two oppoiste ends of the connecting member, an insulative tube mounted inside the connecting member, a metal rod mounted inside the insulative tube and connected to one terminal of the high voltage generator for discharging a high voltage in an annular air tunnel within the connecting member outside the insulative glass tube for converting ozygen into ozone, permitting ozone to be guided out one wind guide shell.

3 Claims, 4 Drawing Sheets

STRUCTURE OF OZONIZER

BACKGROUND AND SUMMARY OF THE INVENTION

The present invention relates to ozonizer for converting oxygen into ozone, and more particularly to such an ozonizer which is simple in structure and durable in use.

A variety of ozonizer have been disclosed, and intensively used for converting oxygen into ozone for purifying air. FIGS. 1 and 2 show an ozonizer according to the prior art. This ozonizer has drawbacks. One drawback of this structure of ozonizer is that the welding points between the wire solder, the magnetic pin and the meshed electrode tend to be caused to oxidized, thereby causing a short circuit. Another drawback of this structure of ozonizer is that the magnetic pin, the meshed electrode, the wire solder and other parts of the ozonizer tend to display, thereby causing a malfunction.

The present invention has been accomplished to provide an ozonizer which eliminates the aforesaid drawbacks. According to the preferred embodiment of the present invention, the ozonizer comprises a hollow connecting member having two stepped extension tubes aligned at two opposite ends and a coupling tube with an integral metal contact pin adapted for connecting to one terminal of a high voltage generator; an insulative glass tube mounted in the connecting member to hold an electrically conductive metal rod on the inside; a first wind guide shell mounted around one stepped extension tube of the connecting member to hold one end of the insulative glass tube and having an integral metal contact pin connected to the electrically conductive metal rod and adapted for connecting to a second terminal of the high voltage generator; a second wind guide shell mounted around one stepped extension tube of the connecting member to hold one end of the insulative glass tube for guiding ozone out of the ozonizer; an annular air tunnel defined within the connecting member around the insulative glass tube and adapted for guiding air from the first wind guide shell to the second wind guide shell, permitting oxygen to be converted therin into ozone; two O-rings and two insulative packing rings respectively mounted around the extension tubes of the connecting member and sealed inside the first wind guide shell and the second wind guide shell. The extension tubes of the connecting member have projecting blocks. The wind guide shells have locating grooves respectively forced into engagement with the projecting blocks of the extension tubes. Because the connecting between the connecting member and the wind guide shells is achieved by forcing respective projecting blocks into engagement with respective locating grooves, the assembly can be detachably and quickly assembled. The projecting blocks of each extension tube of the connecting member and the locating grooves of the wind guide shells are respectively spaced from one another at 90° angle, therefore the angulur position of each wind guide shell relative to the connecting member can be adjusted. The first wing guide shell and the second wind guide shell are symmetrical, and can be molded from a same mold. The connecting member and the wind guide shells have respective mounting plates and mounting holes in the mounting plates for mounting. Furthermore, the connecting member has a coupling tube raised from the periphery around the metal contact pin thereof, and adapted for coupling to the high voltage generator conveniently.

DETAILED DESCRIPTION OF THE PREFERRED EMBODIMENT

Figure 1:
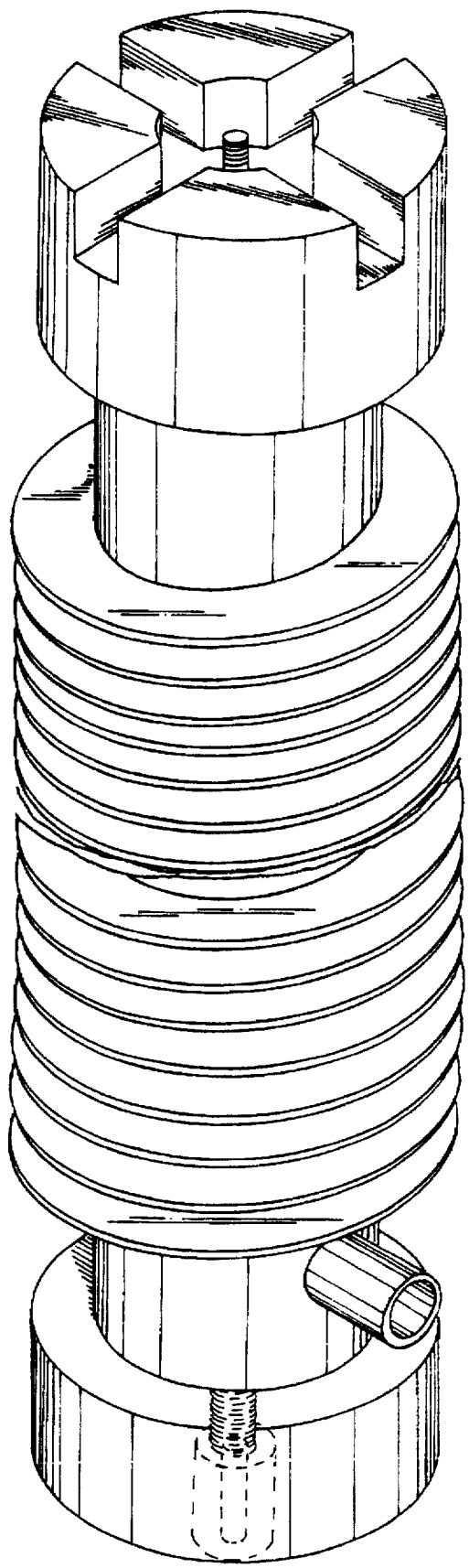
FIG. 1 is an elevational view of an ozonizer according to the prior art.
Figure 2:
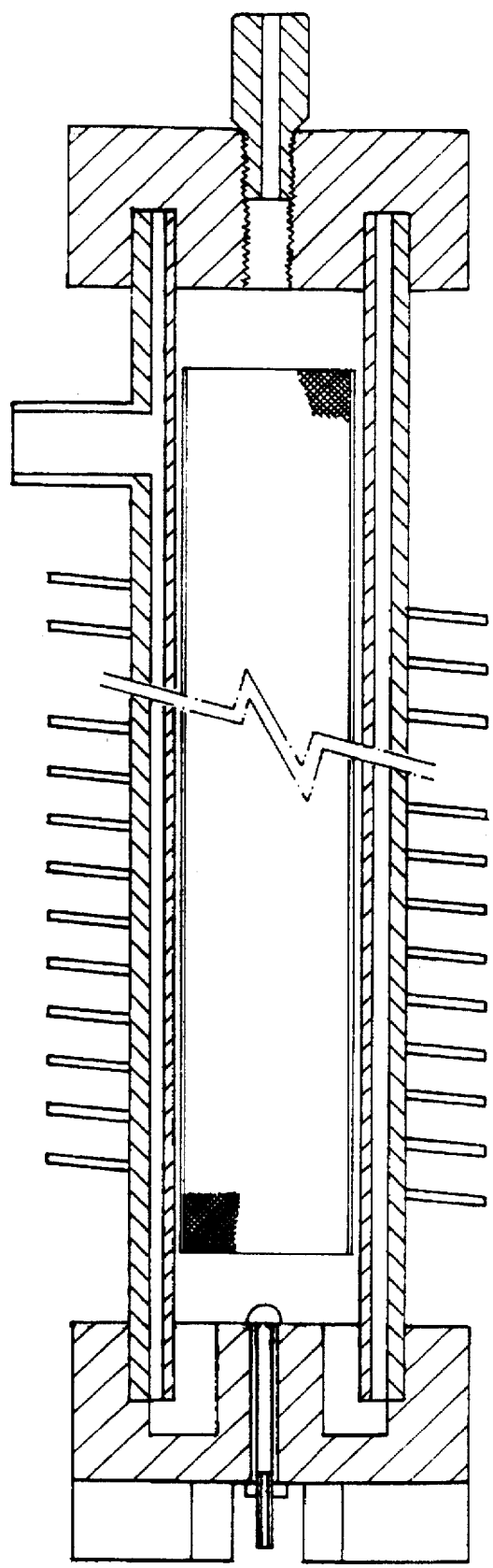
FIG. 2 is a longitudinal view in section of the ozonizer shown in FIG. 1.
Figure 3:
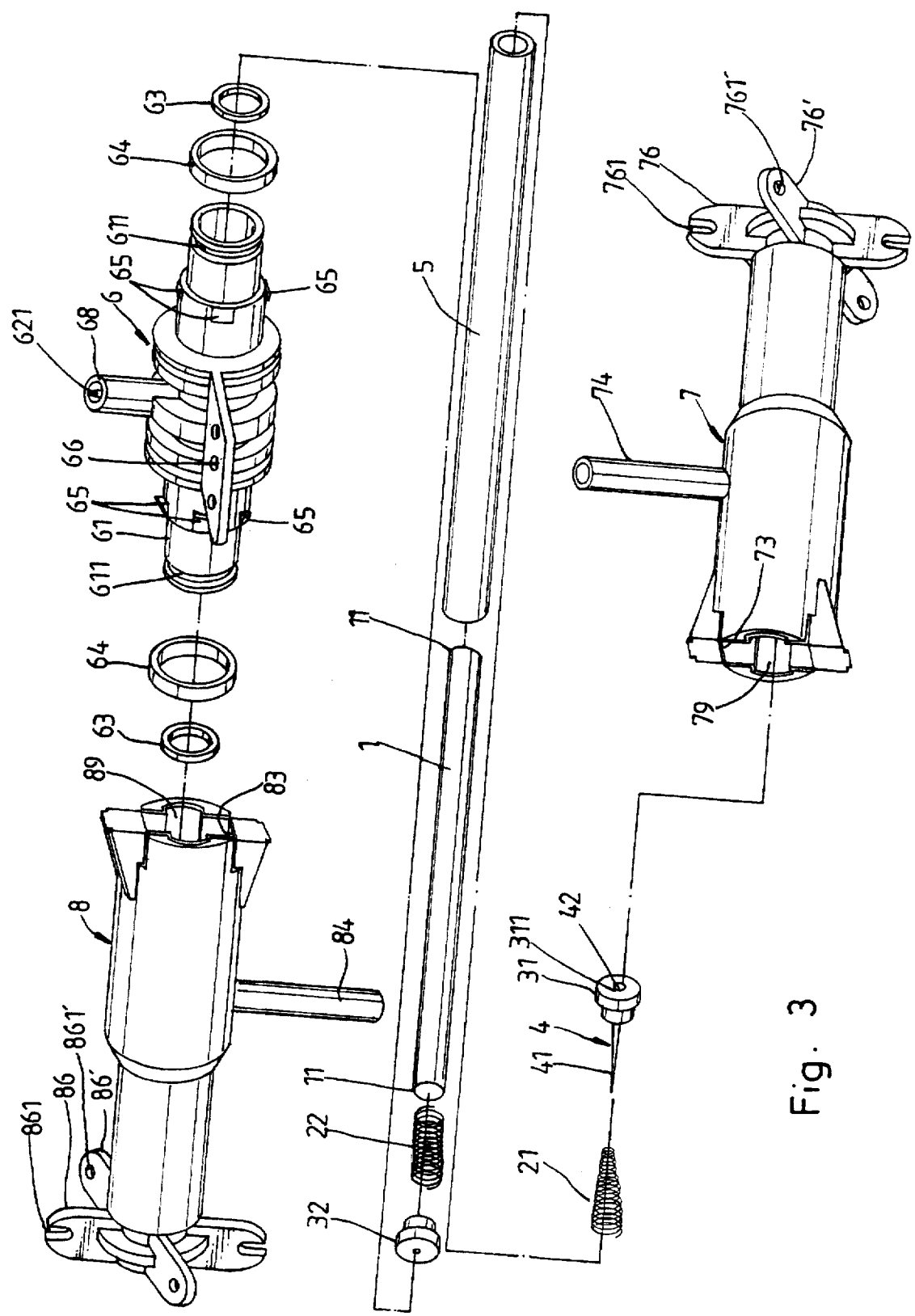
FIG. 3 is an exploded view of an ozonizer according to the present invention.
Figure 4:
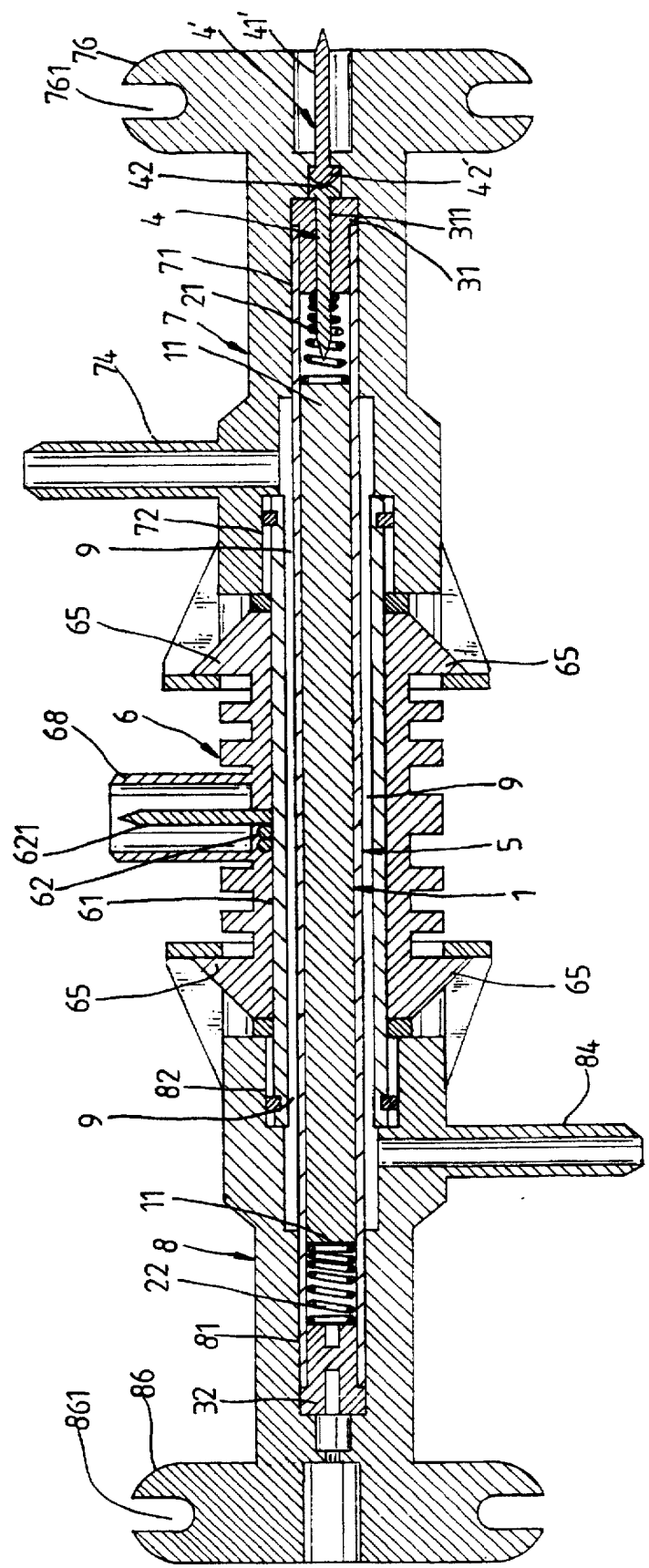
FIG. 4 is a sectional assembly view in an enlarged scale of the ozonizer shown in FIG. 3.

Referring to FIGS. 3 and 4, an ozonizer is adapted for connecting to a high voltage generator, and controlled to discharge a high voltage for converting oxygen into ozone, comprised of an electrically conductive metal rod 1, a first metal spring 21, a second metal spring 22, a first insulative stopper 31, a second insulative stopper 32, a first metal contact pin 4, a second metal contact pin 4', an insulative glass tube 5, a connecting member 6, a first wind guide shell 7, and a second wind guide shell 8.

The insulative glass tube 5 is inserted through the connecting member 6 and received in the wind guide shells 7, 8 to hold the electrically conductive metal rod 1 on the inside. The insulative stoppers 31, 32 are respectively fastened to the two opposite ends of the insulative glass tube 5, to stop the electrically conductive metal rod 1 inside the insulative glass tube 5. The first metal spring 21 and the second metal spring 22 are mounted inside the insulative glass tube 5, and respectively stopped beetween the two oppoiste ends 11 of the electrically conductive metal rod 1 and the insulative stoppers 31, 32. The first metal contact pin 4 is fitted into the axial center through hole 311 of the first insulative stopper 31, having a tip 41 disposed in contact with the first metal spring 21, and a head 42 disposed outside the first insulative stopper 31 and maintained in contact with the head 42' of the second metal contact pin 4', which is mounted inside the first wind guide shell 7 (see FIG. 4). The connecting member 6 is a hollow cylindrical member comprising two stepped extension tubes 61 longitudinal aligned at two oppoiste ends, a transverse coupling tube 68 perpendicularly raised from the periphery and equally spaced between the stepped extension tubes 61, a metal contact pin 62 suspending in the transverse coupling tube 68 and having a tip 621 adapted for connecting to the high voltage generator, two annular grooves 611 respectively formed around the periphery of the stepped extension tubes 61, two sets of projecting blocks 65 respectively raised around the stepped extension tubes 61 and axially spaced between the annular grooves 611 and the transverse coupling tube 68, and two mounting plates 66 bilaterally and perpendicularly raised from the periphery at two opposite sides between the stepped extension tubes 61. Two O-rings 63 are respectively mounted around the annular grooves 611 of the stepped extension tubes 61 and respectively retained inside the wind guide shells 7, 8. Two insulative packing rings 64 are respectively mounted around the stepped extension tubes 61 and stopped between the projecting blocks 65, the wind guide shells 7, 8. When the insulative glass tube 5 is mounted inside the connecting member 6, an annular tunnel 9 is defined within the connecting member 6 around the insulative glass tube 5. The wind guide shells 7, 8 are symmetrical, and respectively mounted around the stepped extension tubes 61 of the connecting member 6. The second metal contact pin 4' is longitudinally disposed one end hole 78 at one end of the first wind guide shell 7, having a tip 41' adapted for connecting to the high voltage generator, and a head 42' disposed in contact with the head 42 of the first metal contact pin 4. The first wind guide shell 7 comprises a stepped axial center hole 71, 72 which receives one end of the insulative glass tube 5 and one stepped extension tube 61 of the connecting member 6, a plurality of locating grooves 73, 79 respectively forced into engagement with the projecting blocks 65 of one stepped extension tube 61 of the connecting member 6, an air tube 74 perpendicularly raised from the periphery in the middle and disposed in communication with the annular tunnel 9, and a plurality of mounting plates 76, 76' with mounting holes 761, 761' adapted for fastening to support means. The projecting blocks 65 of each stepped extension tube 61 are preferably equiangularly spaced from one another at 90° angle, and the locating grooves 73, 79 are equiangulary spaced from one another to match with the projecting blocks 65 of one stepped extension tube 61. The second wind guide shell 8 comprises a stepped axial center hole 81, 82 which receives one end of the insulative glass tube 5 and one stepped extension tube 61 of the connecting member 6, a plurality of locating grooves 83, 89 respectively forced into engagement with the projecting blocks 65 of one stepped extension tube 61 of the connecting member 6, an air tube 84 perpendicularly raised from the periphry in the middle and disposed in communication with the annular tunnel 9, and a plurality of mounting plates 86, 86' with mounting holes 861, 861' adapted for fastening to support means. When assembled, the O-rings 63 and the insulative packing rings 64 are respectively sealed between the stepped extension tubes 61 of the connecting member 6 and the periphery of the stepped axial center hole 71, 72 of the first wind guide shell 7 and the periphery of the stepped axial center hole 81, 82 of the second wind guide shell 8.

Referring to FIG. 4 again, when in use, the metal contact pin 62 of the connecting member 6 and the second metal contact pin 4' are respectively connected to the two opposite terminals of the high voltage generator, and the air tube 74 of the first wind guide shell 7 is connected to an air supply source. When the high voltage generator and the air supply source are started, compressed air is guided through the air tube 74 of the first wind guide shell 7 and the annular air tunnel 9 and then guided out of the air tube 84 of the second wind guide shell 8. When compressed air passed through the annular air tunnel 9, a high voltage is discharged through the metal contact pins 62', 4' to convert oxygen into ozone, and therefore ozone is guided out of the second wind guide shell 8 through the air tube 84.

I claim:

1. An ozonizer connected to a high voltage generator and an air supply source, and controlled to discharge a high voltage for converting oxygen into ozone, the ozonizer comprising:

a hollow connecting member, said hollow connecting member comprising two stepped extension tubes longitudinally aligned at two opposite ends, a transverse coupling tube perpendicularly raised from the periphery and equally spaced between said stepped extension tubes, a metal contact pin suspending in said transverse coupling tube and connected to one terminal of said high voltage generator, two annular grooves respectively formed around the periphery of said stopped extension tubes, and two sets of projecting blocks respectively raised around said stepped extension tubes and axially spaced between said annular grooves and said transverse coupling tube;

an insulative glass tube inserted through said hollow connecting member;

an electrically conductive metal rod mounted inside said insulative glass tube;

two insulative stoppers respectively fastened to two opposite ends of said insulative glass tube to stop said electrically conductive metal rod inside said insulative glass tube;

a first metal spring and a second metal spring respectively mounted inside said insulative glass tube, and stopped between said electrically conductive metal rod and said insulative stoppers;

a first metal contact pin fastened to one of said insulative stoppers and having a tip disposed in contact with said first metal spring and a head disposed outside said insulative glass tube;

a first wind guide shell mounted around one stepped extension tube of said connecting member to hold one end of said insulative glass tube, said first wind guide shell comprisng a stepped axial center hole which receives one end of said insulative glass tube and one stepped extension tube of said connecting member, a plurality of locating grooves respectively forced into engagement with the projecting blocks of one stepped extension tube of said connecting member, and an air tube perpendicularly raised from the periphery in the middle and connected to said air supply source;

a second metal contact pin integrally made inside said first wind guide shell and connected on one terminal said high voltage generator and disposed in contact with the head of said first metal contact pin;

a second wind guide shell mounted around one stepped extension tube of said connecting member to hold one end of said insulative glass tube, said first wind guide shell comprising a stepped axial center hole which receives one end of said insulative glass tube and one stepped extension tube of said connecting member, a plurality of locating grooves respectively forced into engagement with the projecting blocks of one stepped extension tube of said connecting member, and an air tube perpendicularly raised from the periphery in the middle and connected to said air supply source;

an annular air tunnel defined within said connecting member around said insulative glass tube and adapted for guiding air from the air tube of said first wind guide shell to the air tube of said second wind guide shell, permitting oxygen to be converted therein into ozone;

two O-rings respectively mounted around the annular grooves of the stepped extension tubes of said connecting member and sealed inside said first wind guide shell and said second wind guide shell; and two insulative packing rings respectively mounted around the stepped extension tubes of said connecting member and sealed between said connecting member and the periphery of the stepped axial center holes of said first wind guide shell and said second wind guide shell.

2. The ozonizer of claim 1 wherein said connecting member has a plurality of mounting plates raised around the periphery and a plurality of mounting holes in each mounting plate for mounting; said first wind guide shell and said second wind guide shell have a plurality of mounting plates and mounting holes in the mounting plates for mounting.

3. The ozonizer of claim 1 wherein the projecting blocks of each stepped extension tube of said connecting member are spaced from one another at 90° angle.

* * * * *

UNITED STATES PATENT AND TRADEMARK OFFICE
CERTIFICATE OF CORRECTION

PATENT NO. : 5,667,756
DATED : September 16, 1997
INVENTOR(S) : Hsi-Yin Ho

It is certified that error appears in the above-identified patent and that said Letters Patent is hereby corrected as shown below:

The assignee name is corrected to read:
--Liu Chang International Co., Ltd.--.

Signed and Sealed this

Nineteenth Day of May, 1998

Attest:

BRUCE LEHMAN

Attesting Officer

Commissioner of Patents and Trademarks